(12) United States Patent
Sudhir

(10) Patent No.: US 10,064,060 B2
(45) Date of Patent: Aug. 28, 2018

(54) FINGERPRINT ACTIVATION OF A PANIC MODE OF OPERATION FOR A MOBILE DEVICE

(71) Applicant: Apple Inc., Cupertino, CA (US)

(72) Inventor: Karthik Sudhir, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/269,885

(22) Filed: May 5, 2014

(65) Prior Publication Data

US 2015/0319294 A1  Nov. 5, 2015

(51) Int. Cl.
| | |
|---|---|
| *H04W 12/08* | (2009.01) |
| *G06F 3/00* | (2006.01) |
| *H04M 1/66* | (2006.01) |
| *H04M 1/67* | (2006.01) |
| *H04W 12/06* | (2009.01) |
| *H04M 1/725* | (2006.01) |
| *G06K 9/00* | (2006.01) |
| *H04L 29/06* | (2006.01) |

(52) U.S. Cl.
CPC .............. *H04W 12/08* (2013.01); *G06F 3/00* (2013.01); *G06K 9/00013* (2013.01); *H04M 1/66* (2013.01); *H04M 1/67* (2013.01); *H04M 1/72541* (2013.01); *H04M 1/72577* (2013.01); *H04L 63/0861* (2013.01); *H04M 2250/10* (2013.01); *H04M 2250/12* (2013.01); *H04W 12/06* (2013.01)

(58) Field of Classification Search
CPC ........ G06F 3/042; G06F 3/0488; G06F 21/32; G06F 21/40; G06F 21/31
See application file for complete search history.

(56) References Cited

U.S. PATENT DOCUMENTS

| | | | | |
|---|---|---|---|---|
| 2009/0117940 | A1* | 5/2009 | Hsu .................... | H04M 1/72563 455/556.1 |
| 2010/0225607 | A1* | 9/2010 | Kim ....................... | G06F 3/042 345/173 |
| 2012/0173427 | A1* | 7/2012 | Sparks ........................... | 705/44 |
| 2013/0183924 | A1* | 7/2013 | Saigh ................... | H04W 4/025 455/404.2 |

(Continued)

*Primary Examiner* — Frantz Bataille
(74) *Attorney, Agent, or Firm* — Brownstein Hyatt Farber Schreck, LLP

(57) ABSTRACT

Fingerprint actuation is described for unlocking a mobile device and activating customized mobile device functions by using a fingerprint authentication technique. The mobile device uses a fingerprint sensor to authenticate a user for allowing secure access to certain mobile device functions or contents, and provides a utility in addition to unlocking the mobile device. This allows the user to control access to one or more mobile device functions concurrently with invoking fingerprint authentication in order to unlock the mobile device when the user presses a finger to the fingerprint sensor. The mobile device may be unlocked using a designated finger that activates a panic mode of operation, wherein personal data stored on the mobile device is not accessible or viewable to the user. In other implementations, the user may register particular fingerprints to be associated with different modes of operation and activate the different modes based on the particular fingerprints.

16 Claims, 7 Drawing Sheets

(56) References Cited

U.S. PATENT DOCUMENTS

| | | | |
|---|---|---|---|
| 2014/0068782 A1* | 3/2014 | Pitt | G06F 21/6254 |
| | | | 726/26 |
| 2015/0106765 A1* | 4/2015 | Lee | G06F 3/0487 |
| | | | 715/810 |
| 2015/0135108 A1* | 5/2015 | Pope | G06K 9/00006 |
| | | | 715/767 |
| 2015/0286852 A1* | 10/2015 | Sengstaken, Jr. | A61J 1/035 |
| | | | 340/10.1 |

* cited by examiner

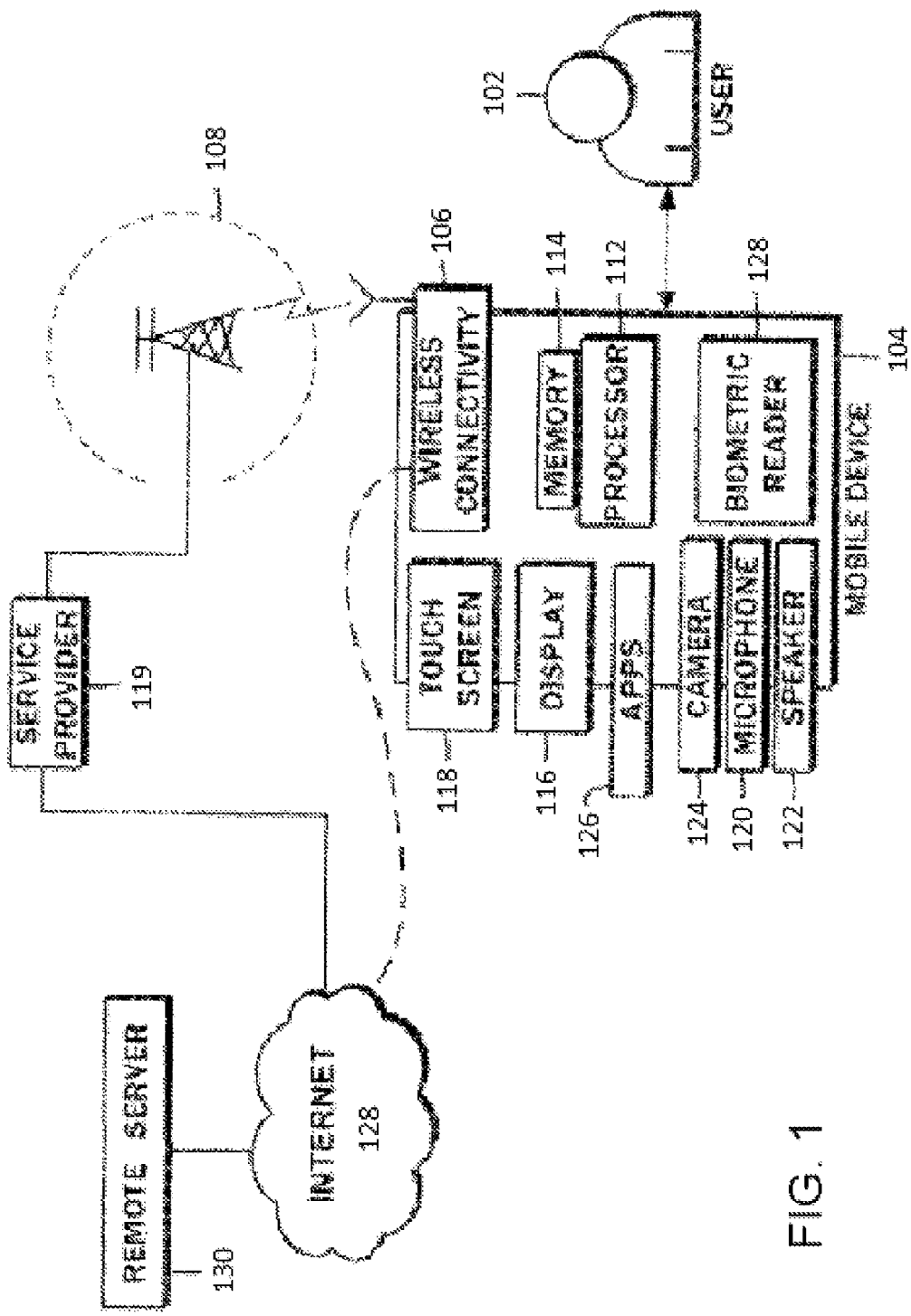

FINGERPRINT ACTIVATION OF A PANIC MODE OF OPERATION FOR A MOBILE DEVICE

OVERVIEW

Mobile devices have advanced dramatically in form and function in recent years. Cell phones that once only provided telephone service, for instance, now typically incorporate advanced computing, networking, and user interface functions, offering various multi-media services and data management functions. Furthermore, the widespread availability of wireless communication service has allowed commercialization of numerous new types of devices and wirelessly-equipped versions of existing devices, such as wirelessly-equipped navigation units, electronic book readers, personal data assistants (PDAs), notebook and tablet computers, cameras and camcorders, and package tracking devices, among others.

With these advances, however, mobile devices have become not only more valuable to their owners, but also more valuable to prospective thieves. For instance, a thief could attempt to steal such a device in order to benefit from personal data stored on the device, or to benefit from use or resale of the device itself. Generally, mobile devices include security mechanisms to prevent access by a user other than the registered user. Such security mechanisms may include password protection, biometric authentication, or facial recognition tools to authenticate a user of the device and prevent access by other users of the device.

For example, a mobile device may include an integrated fingerprint sensor and logic arranged to capture a fingerprint of a user's finger to authenticate the user based on the captured fingerprint. The mobile device becomes unlocked and available for use when the captured fingerprint of the user is authenticated. The fingerprint sensor can be integrated in an outwardly visible manner or hidden beneath an outer surface of the mobile device housing/button, such that the user of the mobile device can intentionally touch a fingertip to the fingerprint sensor so as to facilitate fingerprint scanning. The fingerprint sensor can be used for other purposes as well, such as to authenticate a user for purposes of allowing secure access to certain mobile device functions or contents, or providing a utility in addition to the authentication mechanism. These alternative security functions can allow the user to control access to one or more mobile device functions concurrently with invoking the fingerprint authentication when the user presses a finger to the fingerprint sensor. In an example, a user can program the mobile device to activate different functions or different security modes of operation based on a particular fingerprint. For example, a user can program the mobile device to enter a limited access mode when the user scans their ring finger. Alternative examples can use other biometric or facial recognition to activate specific security modes.

BRIEF DESCRIPTION OF THE DRAWINGS

Some embodiments are illustrated by way of example and not limitation in the figures of the accompanying drawings in which:

FIG. 1 is a block diagram illustrating an environment for operating a mobile device, according to an example embodiment.

DETAILED DESCRIPTION

Figure 2A:
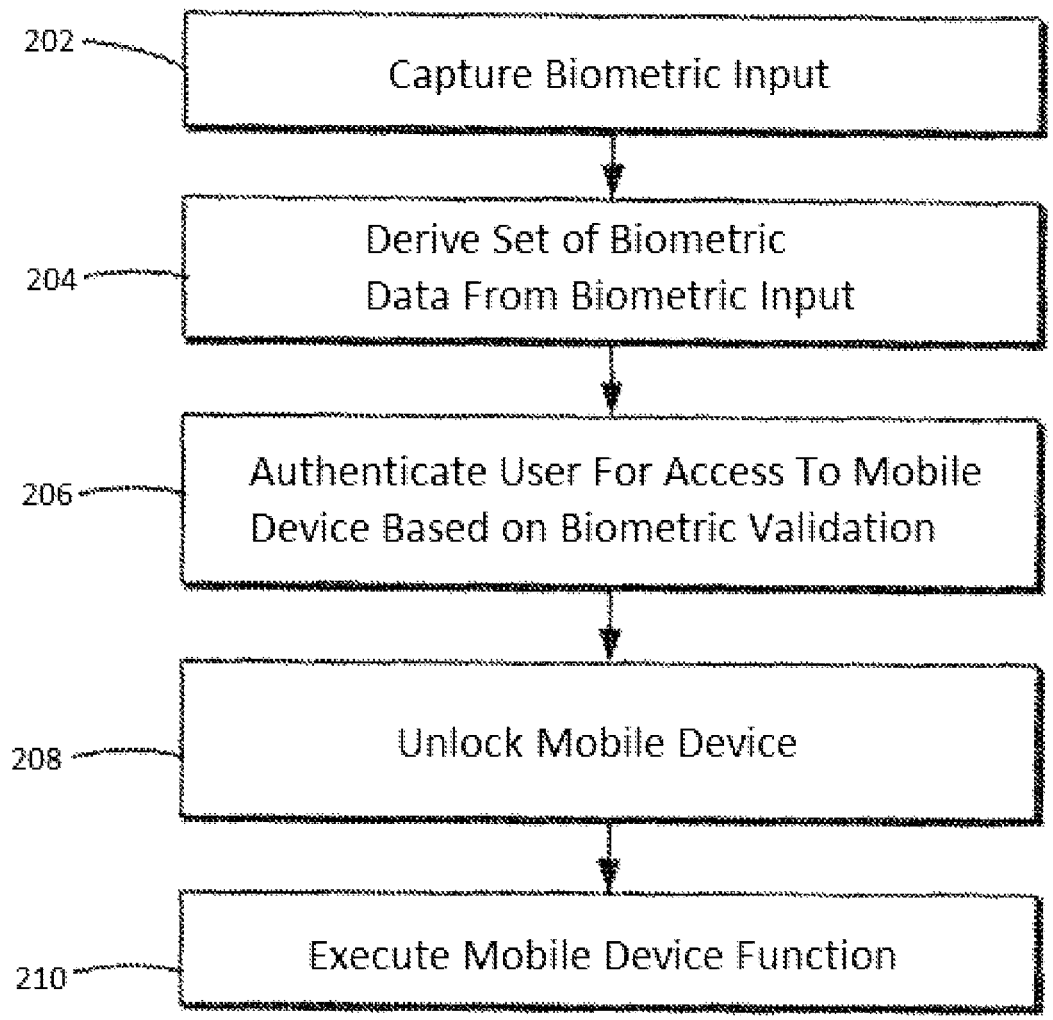
FIGS. 2A-2B show flowcharts illustrating two example embodiments of methods for authenticating a user for access to mobile device functions and a panic mode of operation.

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

According to various embodiments, fingerprint scanning is described for unlocking a mobile device and activating customized mobile device functions by using a fingerprint authentication technique. Fingerprint scanning is used throughout this disclosure as an example method of unlocking a mobile device and activating custom functions, but other mechanisms such as passwords, facial recognition, or other biometric security measures can also be used to activate similar functions. For example, the mobile device may use a fingerprint sensor to authenticate a user for purposes of allowing secure access to certain mobile device functions or contents, and provides a utility in addition to unlocking the mobile device. This allows the user to control access to one or more mobile device functions concurrently with invoking fingerprint authentication in order to unlock the mobile device when the user presses a finger to the fingerprint sensor. In certain implementations, the mobile device may be unlocked using a designated finger that activates a panic mode of operation. In the panic mode, personal data stored on the mobile device is not accessible or viewable to the user. In an example, panic mode can be pre-configured by the mobile device owner to implement a variety of different security functions ranging from securing personal data to resetting the device to locking out all functions until a password or different designated finger is scanned. Panic mode in particular is designed to protect both user data and the mobile device from theft. In other implementations, the user may register particular fingerprints to be associated with different modes of operation and activate the different modes based on the particular fingerprints.

Figure 3:
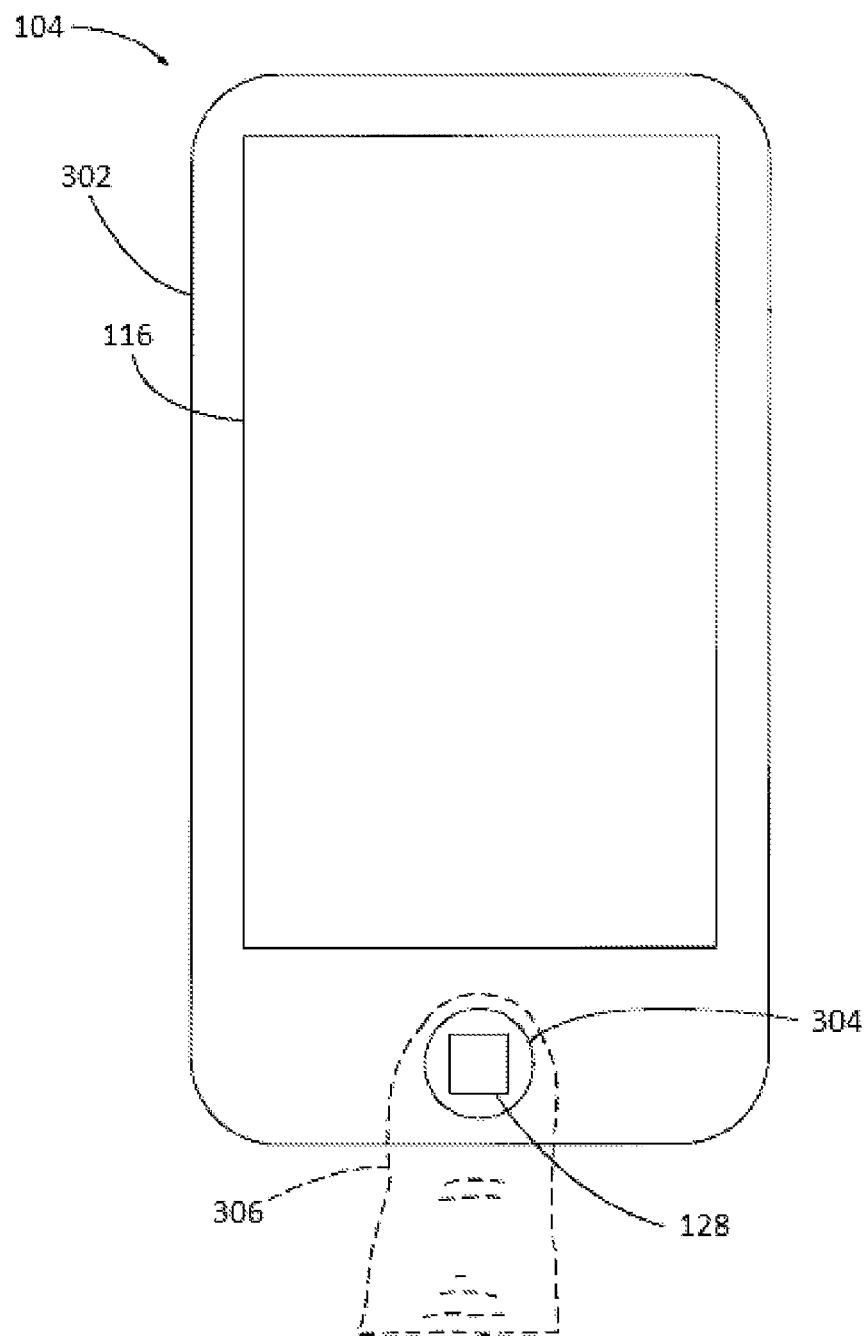
FIG. 3 illustrates an exemplary mobile device, according to an example embodiment.

The block diagram of FIG. 1 depicts one exemplary environment 100 in which various embodiments of the present disclosure may be implemented. A user 102 can be in physical possession of a mobile device 104 that has various data processing and communications features, as will be detailed more fully below in relation to FIG. 3. The mobile device 104 may be a smartphone-type apparatus that has a wireless network connectivity module 106 for placing telephone calls or receiving/transmitting messages over a mobile telecommunications network 108 managed by a service provider 110, such as Verizon, AT&T, Nextel, Sprint, T-Mobile, US Cellular, Boost, Cricket, Vodafone, Telefonica, Orange, TIM, Telecom Italia, and others. The wireless network connectivity module 106 may also be utilized for data communications other than voice telephone calls. Aside from utilizing the mobile telecommunications network 108, the wireless network connectivity module 106 may also be configured for GSM, CDMA, WCDMA, 4G, LTE, EDGE, the Internet, Wi-Max, Wi-Fi (IEEE 802.11x), Bluetooth, and other similar wireless communications functions. The mobile device 104 can also be connected to the Internet at least via the service provider 110.

The mobile device 104 may have stored thereon programmed instructions that comprise software applications that provide functionality in addition to making and receiving telephone calls, such as simple message service (SMS) text messaging, e-mail, calendars/to-do, photography, videography, media playback, and web browsing, among many others. The various functions of mobile device 104 can be handled by a general purpose data processor 112. In particular, the general purpose data processor 112 executes programmed instructions that are stored in a memory 114. The wireless network connectivity module 106 cooperates with the processor 112 to perform at least one wireless communications function, for example, for voice and/or data. Alternatively, in some embodiments, the mobile device 104 does not include the wireless network connectivity module 106. According to one embodiment, the tangibly embodied instructions, when executed may perform authentication of user 102 for accessing the mobile device 104.

The results of the computation performed by the general purpose data processor 112, and in particular a user interface for various applications, can be displayed or output to a screen 116. Commonly, the screen 116 is a liquid crystal display (LCD) or similar display device of varying dimensions fitted to the housing of the mobile device 104. Inputs for the computation and other instructions to the mobile device 104 can be provided via a touch input panel 118 that may be overlaid on the screen 116. In certain implementations, the screen 116 and the touch input panel 118 are integrated. Besides the touch input panel 118, there may be alternative input modalities such as a keypad (not shown). The arrangement of the keys on the keypad may be different to fit within the dimensions of the mobile device 104. Along these lines, other input/output devices such as a microphone 120 for receiving audio or voice signals is included, as well as a speaker 122 for outputting audio. For capturing and providing visual data to the mobile device 104, there may be an integrated camera 124 comprising a lens, an imaging sensor, and a dedicated image processor connected to the general purpose data processor 112. The camera 124 may be utilized to capture still images as well as a video stream, the data for which is stored on the memory 114.

There are numerous variations of the mobile device 104 or smart phone that are currently available on the market, including the iPhone from Apple, Inc. It is also contemplated that various embodiments of the present disclosure may be implemented on mobile devices other than smartphones or cellular phones, such as tablet-type mobile devices including the iPad from Apple, Inc., full feature media player devices including the iPod from Apple, Inc., computing devices including the MacBook from Apple, Inc., and other portable devices. The specifics of the mobile device 104 are presented by way of example only and not of limitation, and any other suitable mobile device 104 may be substituted.

In one example of the present disclosure, the mobile device 104 is used to authenticate the user 102 for access to applications or functions 126 associated with the mobile device 104. In this example, the mobile device 104 is protected from unauthorized access (e.g., the mobile device is in a locked mode), and the disclosed method for authenticating the user 102 may be utilized to permit access. The following description will be in the context of the mobile device 104, but one of ordinary skill in the art will readily recognize the applicability or non-applicability and necessary substitutions for various disclosed features to implement the contemplated mobile device-based authentication in other contexts, such as on a laptop-style portable personal computer.

Figure 2B:
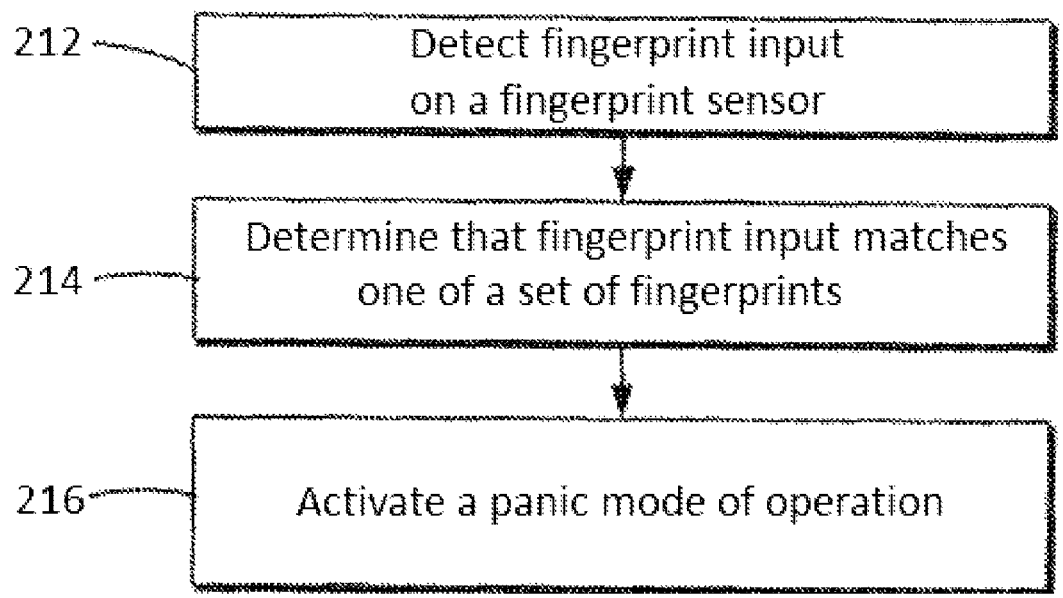

With additional reference to the flowcharts of FIG. 2A-2B, the process 200 of activating a panic mode or pre-defined function is illustrated. The process 200 can begin with activating the mobile device 104, such as when the user presses a button to turn on the mobile device 104 from a locked mode (or a sleep mode). Because, in this example, the mobile device 104 is in a locked mode and cannot be accessed, the mobile device 104 may require the user 102 to submit authentication information, such as a fingerprint of the user 102. The method of authenticating the user 102 can begin with operation 202 of detecting a fingerprint input from the user 102 on a fingerprint sensor (e.g., biometric sensor 128) of the mobile device 104. As shown with more detail in FIG. 3, the mobile device 104 is understood to include a portable housing 302, with the processor 112 carried within the portable housing 302. The mobile device 104 is illustratively a mobile wireless communications device, for example, a cellular telephone, but may also be any another type of electronic device, for example, a tablet computer, laptop computer, etc. The display 116 is also carried by the portable housing 302 and is coupled to the processor 112. The display 116 may be a liquid crystal display (LCD), for example, or may be another type of display, as will be appreciated by those skilled in the art. A finger-operated user input device 304, illustratively in the form of a pushbutton switch, is also carried by the portable housing 302 and is coupled to the processor 112. The pushbutton switch 304 cooperates with the processor 112 to perform a device function in response to the pushbutton switch. For example, a device function may include a powering on or off of the mobile device 104, unlocking the mobile device 104 from the locked mode, actuating a customized function (e.g., entering a panic mode), initiating communication via the wireless network connectivity module 106, and/or performing a menu function. The pushbutton switch 304 may be a home switch or button, or key. Further, other device functions may be performed based upon the pushbutton switch 304. In some embodiments, the finger-operated user input device 304 may be a different type of finger-operated user input device, for example, forming part of a touch screen display. Other or additional finger-operated user input devices may be carried by the portable housing 302.

The mobile device 104 is switchable between a user-interface locked mode and a user-interface unlocked mode. More particularly, in the user-interface locked mode, the processor 112 may restrict corresponding device operations of the pushbutton switch 304 or other user input device. For example, in the user-interface locked mode, operation of the pushbutton switch 304 may turn on the display 116 with a message that the device is locked, while in the user-interface unlocked mode, operation of the pushbutton switch may perform a corresponding device function, for example, a home function, as noted above. In the user-interface locked mode, additional or other user-input devices, such as camera 124 and microphone 120, may be inoperative or may not perform the corresponding function as in the user-interface unlocked mode.

In an example, the biometric reader 128 may be carried by the pushbutton switch 304 to sense a user's finger 306 or an object placed adjacent the biometric reader 128. The biometric reader 128 can be carried by the pushbutton switch 304 such that when a user contacts and/or presses downward on the pushbutton switch, data from the user's finger 306 is acquired, for example, for fingerprint matching, as will described in further detail below. In other words, the biometric reader 128 may be responsive to static contact or placement of the user's finger 306 or another object. In other embodiments, for example, where the biometric reader 128 is not carried by a pushbutton switch 304, the biometric reader may be a slide sensor (not shown) and may be responsive to sliding contact, or the biometric reader may be a standalone static placement sensor. In this example, the biometric reader is positioned on a front face of the mobile device 104, though this is merely exemplary. The biometric reader 128 may alternatively be disposed on any of the sides or a rear face of the mobile device 104. Those having ordinary skill in the art will be capable of optimizing the position of the biometric reader 128 in accordance with the ergonomic needs of the user 102. As an alternative to the integrated biometric reader 128, it is also possible to attach an external variant via an external data communication port included with the mobile device 104.

In one embodiment, the biometric reader 128 can be a fingerprint sensor positioned behind or otherwise integrated with a button of the mobile device 104. The fingerprint sensor in this position would have optical, electrical, or other connectivity with an outer surface of the button onto which the user would place a fingertip. In such an embodiment, the biometric reader 128 is understood to be incorporated into or part of the touch screen display 116. Instead of the fingerprint sensor, an imaging device such as an on-board camera with sufficient macro focus capabilities may be utilized to capture an image of the fingerprint. It will be appreciated that any other type of sensor technology known in the art or otherwise can capture characteristics of a person's fingerprint can also be utilized.

The button may be a mechanical pushbutton switch 304 as previously described, a slider switch, or another type of button or switch on the device, preferably separate and apart from a display screen of the device (and thus not integrated with the display screen). For instance, the button could be made of a glass or Plexiglas material that allows optical communication through the button from the outer surface to the fingerprint sensor, or the button could be made of a conductive material that allows electrical connection through the button from the outer surface to the fingerprint sensor. Alternatively, the button could itself be the fingerprint sensor or part of the fingerprint sensor, such that application of a fingertip to the button would constitute application of a fingertip to the fingerprint sensor itself.

As a specific example, the button may be a "home" button that a user can engage in order to return the device to a home state in which the device displays a default user interface or the like. For example, a commercial example of a button with integrated fingerprint scanning is available from Apple, Inc. and is referred to as a Touch ID sensor ("Touch ID"). The Touch ID responds to a touch of the Home button on the iPhone that uses a fingerprint as a passcode to unlock the phone. As another example, the button may be a navigation button that a user can engage and perhaps toggle or otherwise move in order to navigate through a user interface of the device. And as still another example, the button may be a power button that a user can engage in order to power-on or power-off the device. Other examples are possible as well, such as a volume control button, a push-to-talk button, a shutter-release button, a setup button, one or more keys on a keyboard or keypad, or other type of button now known or later developed, in any of a variety of positions on the device.

Referring back to the flowchart of FIG. 2A, the capture of biometric input (e.g., user fingerprint) may be initiated in operation 202 by the user 102 pressing the button/pushbutton switch 304 with an appropriate, pre-designated finger positioned over the biometric reader 128. The process 200 continues with an operation 204 of deriving a set of biometric data from the captured biometric input from operation 202. In embodiments using the fingerprint sensor, an image of a captured fingerprint may be generated and stored in the memory 114. Because comparison of raw fingerprint images can be computationally intensive and requires a substantial amount of processing power and memory, select highlights of pertinent points are derived. A much smaller dataset representative of the fingerprint can be generated, and can be used as a basis for further comparison. Depending on security requirements and the degree of false positives or negatives acceptable, the number of elements in the set of biometric data can be modified. The set of biometric data (e.g., containing fingerprint data) is compared against existing biometric data stored in the memory 114.

The process 200 proceeds to an operation 206 of comparing the biometric data from the captured biometric input of the user to a plurality of existing biometric data sets. More particularly, the biometric data is validated against a pre-enrolled set of biometric data to authenticate the user and determine whether the user is approved for access to the mobile device 104. If the biometric data is accepted as matching one of the authorized users', the mobile device 104 is unlocked and becomes accessible in an unlocked mode (from the previous locked mode). When the mobile device 104 is in the locked mode, permission to access certain, part, or all functions of the mobile device is denied. Those functions include but not limited to, access to user account, Internet browsing, modifying setting, file access, launching software. When the mobile device 104 is in the unlocked mode, a state wherein the mobile device 104 is unlocked, permissions granted to the user are to access certain part, or all functions of the mobile device, including login to user accounts, using Internet, modifying settings, file access. Further, when the mobile device 104 is in the unlocked mode, it can be controlled or responsive to further interactive user inputs.

In one example, captured fingerprints can be matched against fingerprints of a list of authorized users. In this example, each different fingerprint can be stored as a distinct biometric data set. At operation 206, the processor 112 determines whether the user has been approved or authenticated. The processor 112 compares the captured fingerprint of the user with a reference fingerprint stored within the memory 114 of the mobile device 104. The processor 112 then compares data extracted from the captured fingerprint to reference fingerprint data. If the processor 112 determines that the captured fingerprint of the user matches a stored reference fingerprint, then the mobile device 104 is unlocked at operation 208 and the user is granted access to utilize the mobile device 104 to call another device, transmit messages, access data stored on the device, etc. If the processor 112 determines that the user is not approved to utilize the mobile device 104, then the operations are repeated until the processor 112 determines that a captured fingerprint of the user is approved.

In certain implementations, the mobile device 104 can be configured to carry out a particular action after the device is unlocked based on the fingerprint used for unlocking. At operation 210, the processor 112 executes a particular function on the mobile device 104 based on the captured fingerprint of the user. Once the mobile device has performed the particular function, the mobile device may return to a locked state or remain unlocked depending on the configuration of the device. It should be appreciated that the mobile device may have a plurality of fingerprints registered for each user. Depending on the user and their access level, certain applications may be accessed or displayed. A different particular function may be associated with a specific finger (e.g., thumb, index, middle, ring, or little finger) that is registered for the user on the mobile device. Depending on the fingerprint that was captured, a particular action may be carried out when the device is unlocked. In one example, a fingerprint of an index finger may indicate that a call is to be placed. When the fingerprint of the user's index finger is captured, when the mobile device is unlocked, a telephone application may be launched to allow the user to place a call after the mobile device has been unlocked.

In another example, a specific finger may be used to unlock the mobile device 104 into a panic mode. The panic mode is a unique mode of operation that is registered to be associated with one or more specific fingers of the user (referred to as panic fingers). During times of distress, the user may use a panic finger to unlock the phone into the panic mode. In certain embodiments, the panic mode provides a mode of operation that limits access to a portion of information stored on the mobile device as a method of protecting data on the device during emergencies or situations during which personal information is more susceptible to mishandling.

Referring now to FIG. 2B, an alternative embodiment of the capture and detection of fingerprint input (e.g., user fingerprint) for activating a panic mode may be initiated in operation 212 by the user 102 pressing the button/pushbutton switch 304 with an appropriate, pre-designated finger positioned over a fingerprint sensor. The process continues with an operation 214 of comparing the captured fingerprint input from operation 202 against a set of fingerprints to determine whether the fingerprint matches a particular one of the set of fingerprints. In operation 216, if the fingerprint input matches the particular one of the set of fingerprints, a panic mode of operation is activated.

In certain implementations, after activation of the panic mode, the mobile device 104 unlocks the screen 116 and displays a user interface that appears to be in a normal operating state, detecting and responding to user input corresponding to interaction with the mobile device 104. While the mobile device 104 is unlocked, the mobile device may display on the touch screen user-interface objects corresponding to one or more functions of the device and/or information that may be of interest to the user 102. The user-interface objects are objects that make up the user interface of the mobile device 104 and may include, without limitation, text, images, icons, soft keys (or "virtual buttons"), pull-down menus, radio buttons, check boxes, selectable lists, and so forth. The displayed user-interface objects may include non-interactive objects that convey information or contribute to the look and feel of the user interface, interactive objects with which the user may interact, or any combination thereof. The user may interact with the user-interface objects by making contact with the touch screen at one or more screen locations corresponding to the interactive objects with which the user wishes to interact. The unlocked mobile device 104 detects and responds to user input for navigating between user interfaces, entry of data and activation or deactivation of functions.

Some embodiments do not use any indicators or feedback to show that the panic mode has been activated. However, when the mobile device 104 is unlocked into the panic mode, personal information items are not accessible. Personal information items include a phonebook, contacts, emails, documents, messages, communication logs, photos, videos, schedules, supplementary services, etc. For example, the mobile device 104 appears to have been restored to factory default settings, wherein any information in erasable memory is deleted or the same as factory settings. The mobile device 104 would appear empty and applications would appear not to have any personal information (e.g., no access to user-level data). From the perspective of the user, the mobile device 104 appears and operates like a brand new phone.

In some embodiments, the processor 112, in the panic mode, activates a camera 124 of the mobile device 104, which allows the camera 112 to discreetly capture photographs and/or record video. By means of the mobile device's camera 124, a photo, a series of photos or a video may be captured of the situation or person(s) acting in a threatening manner that led the user 102 to activate the panic mode. Moreover, the mobile device 104 may be set to automatically take and transmit photos or videos via the Internet 128 to be stored a remote server 130. For example, the photos or videos may be emailed or otherwise transmitted to the remote server 130. For transmission, any type of transmission designed to move captured information from the mobile device 104 to another location is acceptable. Wireless Internet, Ethernet, or other network connections can be used to transfer the captured information to a different device or site (e.g., remote server 130).

Alternatively, the photos or videos may be stored on the memory 114 of the mobile device 104 if network connectivity is not available using the wireless network connectivity module 106. This allows emergency response providers that monitor the remote server 130 to view the stored photos and determine an appropriate response. A photograph of the user 102 can also be transmitted, taken with the phone or loaded from an existing photo in the mobile device's memory 114 to the remote server 130 for assistance in identifying the user 102 of the mobile device 104. Further, any stored photos or videos on the remote server 130 can be supplied to a responding police force for assistance in responding to or following up on the panic mode.

In some embodiments, the panic mode includes audio recording and relay. When the panic mode is activated (e.g., by fingerprint authorization as described above) the device can begin audio recording and immediate transmission of the audio, as desired. The user 102 of the mobile device 104 can start verbally describing the wrongdoer. In many instances, the wrongdoer will be known to the user 102. In such a case, the user 102 can merely state the known wrongdoer's name. In other cases, the user 102 can start providing a verbal description of the wrongdoer. The audio recording and transmission proceeds in an uninterruptible manner similar to that described above for photo capture and transmission. In some example, a service provider can forward the audio and/or image data to law enforcement to assist in intervening in suspicious or criminal behavior or in apprehending the wrongdoer.

In some embodiments, the mobile device 104 may be activated into the panic mode in emergency situations to act as a beacon. If there is a nearby device, the nearby other device (e.g., a PDA carried by another person, a computer in an automobile, etc.) can be alerted with an alarm so that the user of the other device might come to the aid of the user initiating the panic mode. For example, triggering the panic mode can send out a signal on multiple frequencies, channels, links, etc., to provide location information relative to other devices so that users of the other devices can provide assistance. Furthermore, as discussed in more detail below, the panic mode may include a locator function that uses, for example, global positioning systems (GPS) and/or cellular location systems to provide the location of the mobile device 104 to emergency response providers. In an exemplary situation, when the user 102 is being mugged or is in an otherwise threatening situation, the mobile device user 104 can put the mobile device 104 into the panic mode, which turns the mobile device into a beacon that gives out its location, while blocking others from gaining access to sensitive information on the mobile device 104. In another exemplary situation, if a hiker falls and requires assistance, the mobile device 104 may be activated into the panic mode to activate a distress call or act as a beacon to alert emergency response providers (e.g. police, fire department, medical responders, etc.). In these examples, the beacon operation can function in coordination with the audio, photo, or video recording and/or transmission, providing as much information as is available to emergency responders.

The locator function provides the location of mobile device 104 when the panic mode is activated to emergency response providers. The locator function is implemented in a variety of manners in different embodiments of the present invention. One embodiment involves the use of a GPS receiver. A GPS receiver utilizes signals from satellites orbiting the earth to determine the position of the receiver. When the panic mode is activated, the GPS receiver determines the location of the mobile device 104. The mobile device 104 then transmits this positional information to the emergency response provider. Another embodiment of the present invention uses a cellular location system to determine the position of the mobile device 104 by triangulation. This cellular location system uses the strength of the signal from a mobile at different cellular stations to determine the location of the mobile device 104. Both the GPS and cellular locator functions help in tracking the location of the mobile phone 104 in case of an emergency arises and the mobile phone 104 sends distress signals in the panic mode. Positional information is beneficial in an emergency situation, allowing the emergency response provider to determine the location of the mobile device 104 without requiring any additional input from the user that activated the panic mode. In other embodiments, the panic mode activates an auto-dial call to e-911 (enhanced 911) to notify law enforcement and provides the location of the mobile phone 104 via the phone's GPS receiver to alert emergency service providers of possible emergencies. In another embodiment, after the panic mode is activated, the mobile device 104 starts sending periodic distress signals using multiple mechanisms, such as SMS, phone calls, GPS, and cellular locators. If the user confirms that there is an emergency, or if contact with the user cannot be established, the mobile device 104 may make contact with the emergency service providers immediately or after a pre-defined delay period expires. In some embodiments, the mobile device 104 may be subject to a follow-up call mechanism in the panic mode. For example, emergency service providers may check in with the user periodically via voice or SMS and alert the authorities if no response is received. The emergency service providers can be a nearest police station or hospital, based on the GPS location, or other relevant agencies.

In some embodiments, the mobile device 104 may be activated into the panic mode that uses the speaker 122 is as an audible alarm or noisemaker that alerts individuals in the immediate area that an emergency exists. Once the panic mode is activated, the speaker 122 begins emitting an alarm-type noise. Various different sounds could be produced, including for example, a noise similar to that produced by a car alarm. In other embodiments, the mobile device 104 may be activated into the panic mode to activate a flashing light source (e.g., flash from the camera 124). Both the flashing light source and the noise alarm serve similar functions. On the one, hand they serve to scare off attackers; on the other hand, they serve to draw attention to the user 102 that initiated the panic mode. Because the mobile device 104 can be activated into the panic mode from anywhere that cellular service is available, the exact location of the user may be unknown to emergency responders. Thus, by drawing attention to the mobile device 104 and its user, the flashing light source and the noise alarm may be helpful to emergency responders attempting to locate the user 102.

Not all situations require all of the panic mode functionalities as described above. In another example, a specific finger may be used to unlock the mobile device 104 into a private mode. The private mode is a unique mode of operation that is registered to be associated with one or more specific fingers of the user. During times of distress that do not necessarily rise to the severity of an emergency, the user may use a private finger to unlock the phone into the private mode. In certain embodiments, the private mode provides a mode of operation that limits access to personal information stored on the mobile device as a method of protecting data on the device during situations during which personal information is more susceptible to mishandling. For example, during situations where the mobile device 104 is more likely to be stolen but when the user 102 does not feel physically threatened to require active panic beacons (e.g., during foreign travel), the private mode may be activated for peace of mind. For example, upon entering a bar or night spot where the mobile device 104 may be more likely to be stolen, the user can activate private mode by scanning the designated finger.

Additional details regarding the functionality provided by the panic mode are detailed below in reference to FIGS. 4-5. Though arranged serially in the example of FIGS. 4-5, other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

Figure 4:
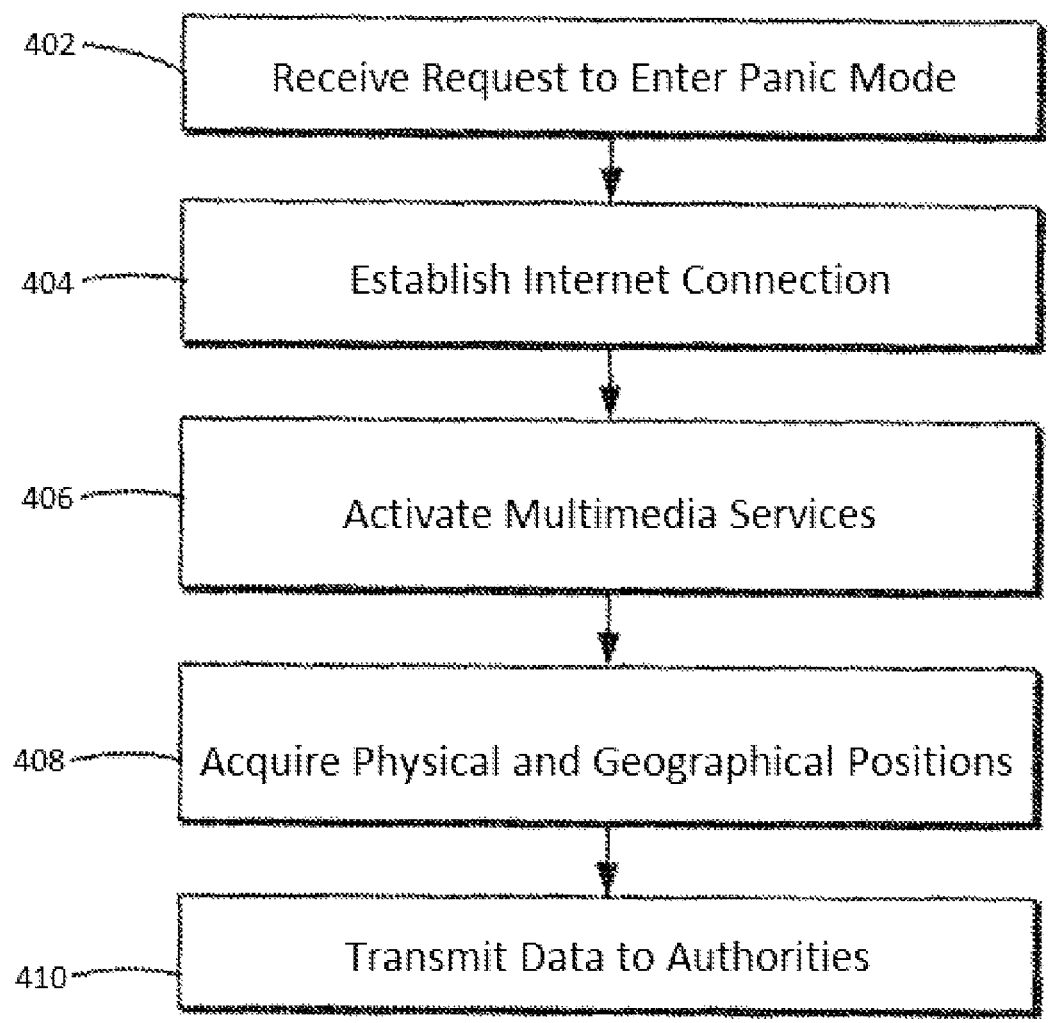
FIG. 4 is a flowchart illustrating a method for activating the panic mode, according to an example embodiment.
Figure 5:
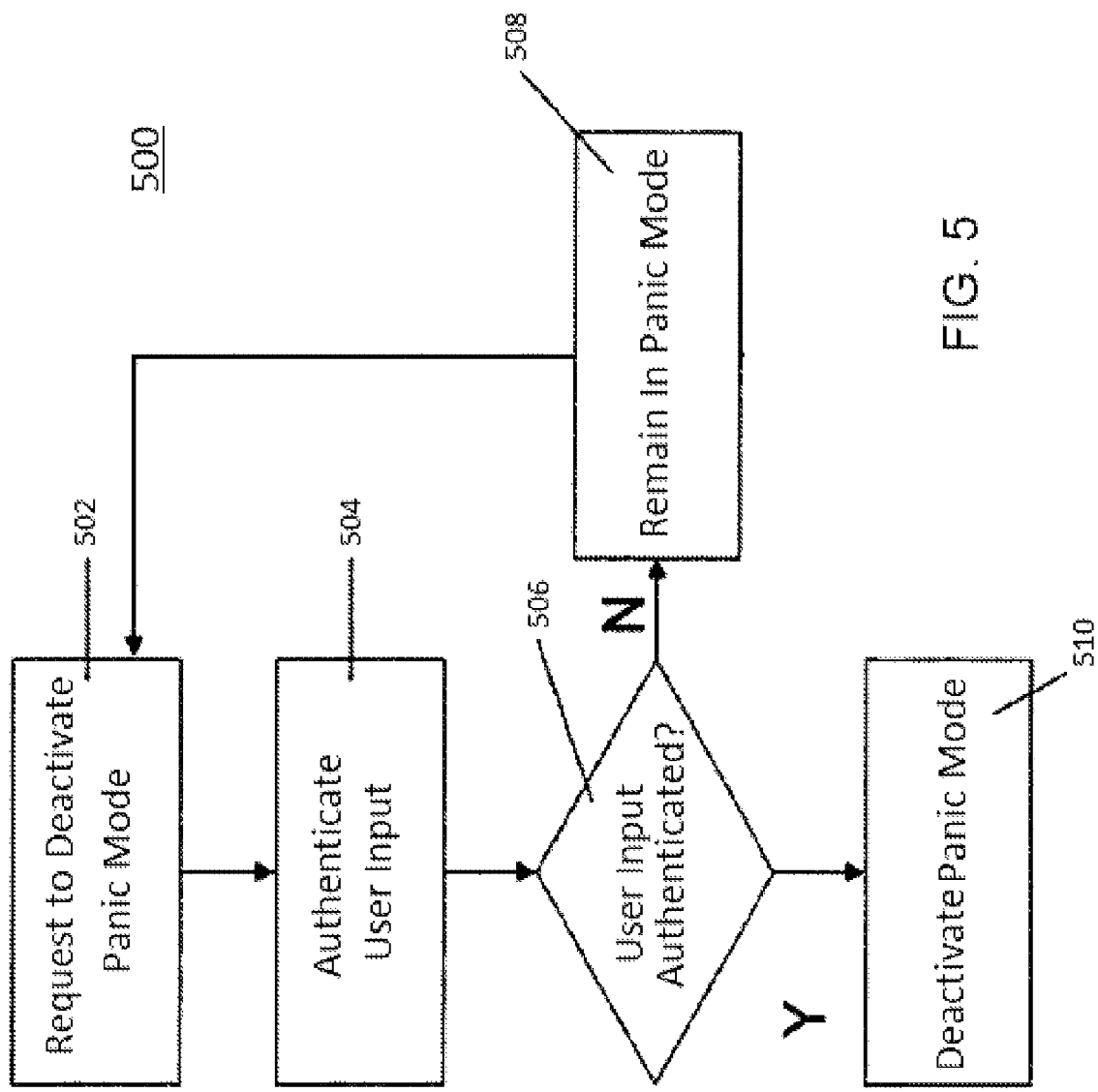
FIG. 5 is a flowchart illustrating a method for remote activation of the panic mode, according to an example embodiment.

FIG. 4 is a diagram of a method 400 for activating the panic mode for facilitating personal and data security on a mobile device, according to an example embodiment. The method 400 may be implemented as instructions in a machine-accessible and computer-readable medium. The instructions may be executed by a machine (mobile device, computer, cell phone, personal digital assistant (PDA), etc.) as previously depicted in FIGS. 1 and 3. The method 400 is also operational over and processes within mobile telecommunications network 108 as depicted in FIG. 1. In an embodiment, the method 400 is implemented and is integrated within a mobile device 104 of user 102 that is not connected to any mobile telecommunications network.

At operation 402, the mobile device 104 receives a request to enter a panic mode of operation. This request is for the mobile device 104 to automatically and dynamically transition itself to the panic mode of operation. Detection of the request for the panic mode of operation can occur in a variety of manners, including fingerprint actuation. At operation 404, the mobile device 104 establishes an Internet connection in response to the request for the panic mode of operation. The mobile device 104 establishes a network connection in response to the panic mode of operation to upload a variety of information, optionally including real-time video and/audio, to a secure website or location (e.g., remote server 130) that is external to the mobile device 104. At operation 406, the mobile device 104 activates multimedia services to record, in real time and dynamically, multimedia data from an environment of the mobile device 104. That is, real-time audio and/or video of the physical surrounds of the mobile device 104 are recorded. Additionally, at operation 408, the mobile device 104 acquires the geographical position for the mobile device 104 while the real-time multimedia data is being recorded. At operation 410, data collected in the previous operations are transmitted to authorities to enable a response to the panic mode.

In certain implementations, once the device has been activated into the panic mode, it may be desirable to provide mechanisms for deactivating the panic mode. With reference to FIG. 5, there is shown a flow diagram illustrating an embodiment of a method 500 for deactivation of the panic mode. The method starts at operation 502 in which a user input is provided to request deactivation of the panic mode. For example, the specific finger used to unlock the mobile device 104 into the panic mode may be used for deactivation. In addition to the biometric reader, mechanisms (other than fingerprints) may capture movement of a user's finger to deactivate the panic mode, according to an implementation of the present disclosure. The particular finger motions may include, for example, a circular motion, a rectangular motion, a swipe motion (up, down, left, right motion), a combination of different swipe motions, or any motion that would be appreciated by a person of ordinary skill in the art. Such motions may be pre-stored in the device and configured by the user. For example, the user may use a circular motion indicates that the user desires to exit out of panic mode. Any combination of the user defined gestures or fingerprinting may be used to deactivate the panic mode. At operation 504, the mobile device performs validation and authentication functions using the received user input. The mobile device determines whether the user input is authenticated at operation 506. If not, the mobile device remains in the panic mode in operation 508. Once the received user input is authenticated, the mobile device is deactivated from the panic mode in operation 510.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
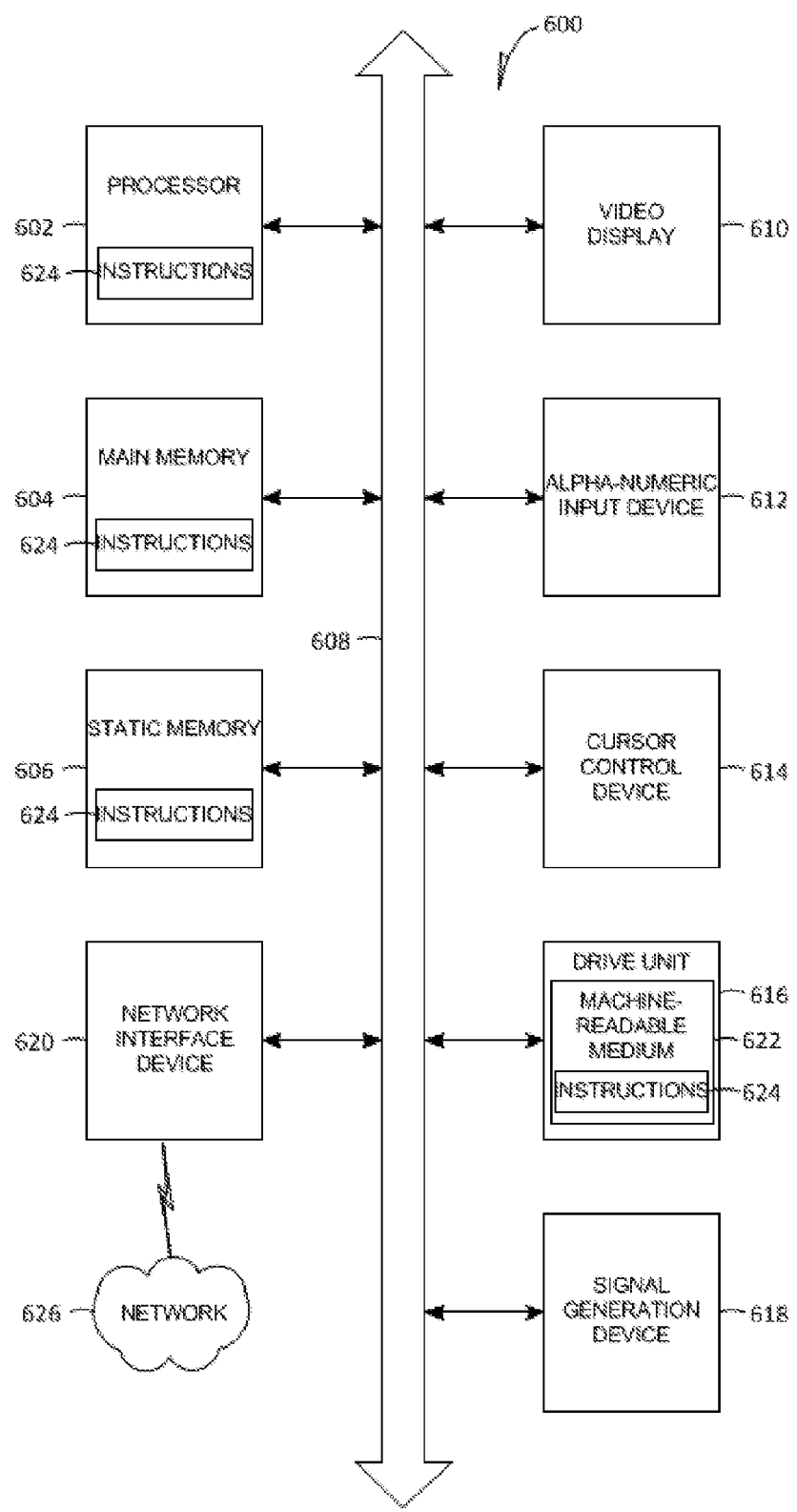
FIG. 6 is a diagrammatic representation of a machine in the example form of a mobile device within which a set of instructions for causing the machine to perform any one or more of the methodologies discussed herein may be executed.

FIG. 6 is a block diagram of machine in the example form of a mobile device 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Though preferably embodied as a mobile device, the machine may also be a computing system, personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example mobile device 600 includes a processor 602 (e.g., a central processing unit (CPU), a graphics processing unit (GPU) or both), a main memory 604 and a static memory 606, which communicate with each other via a bus 608. The mobile device 600 may further include a video display unit 610 (e.g., liquid crystals display (LCD) or a cathode ray tube (CRT)). The mobile device 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or used by any one or more of the methodologies or functions described herein. The instructions 624 may also reside, completely or at least partially, within the main memory 604, static memory 606, and/or within the processor 602 during execution thereof by the mobile device 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transition Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
  detecting a fingerprint input of a user of a mobile device, on a fingerprint sensor of the mobile device;
  determining that the fingerprint input matches a particular one of a set of fingerprints; and
  determining, based on the fingerprint input matching the particular one of the set of fingerprints, a mode of operation to be activated for the mobile device, wherein a standard mode of operation is to be activated in response to determining that the fingerprint input is associated with a first finger of the user; and
  further wherein a panic mode of operation for the mobile device is to be activated in response to determining that the fingerprint input is associated with a second finger of the user, wherein the panic mode of operation automatically disables access to a portion of personal information that is electronically stored for the user on the mobile device, establishes a network connection in response to the panic mode of operation, records data from an environment of the mobile device, and transmits data to a remote server to enable a response to the panic mode of operation.

2. The method of claim 1, further comprising:
receiving a deactivation input; and
deactivating the panic mode of operation.

3. The method of claim 1, wherein the particular fingerprint is a registered fingerprint of a particular finger of the user.

4. The method of claim 1, wherein the panic mode disables a pre-defined set of functions the mobile device is normally operable to perform.

5. The method of claim 4, wherein the panic mode displays a user interface that provides an appearance of the mobile device having a set of default factory settings.

6. The method of claim 1, wherein the portion of personal information that is not accessible to the user during the panic mode includes at least one of contact information, emails, photos, videos, or documents.

7. The method of claim 1, wherein the panic mode of operation includes emitting a beacon signal from the mobile device.

8. The method of claim 1, wherein the panic mode of operation includes transmitting an alert using a cellular network to an emergency service provider.

9. The method of claim 1, wherein the panic mode of operation includes recording a photograph or a video using a camera of the mobile device.

10. The method of claim 1, wherein the panic mode of operation includes recording an audio file using a microphone of the mobile device.

11. A mobile device, comprising:
a display;
a biometric sensor;
one or more processors; and
a computer-readable medium storing instructions for execution by the one or more processors, the instructions when executed by the one or more processors cause the mobile device to:
detect a fingerprint input of a user of a mobile device, on the biometric sensor of the mobile device;
determine that the fingerprint input matches a particular fingerprint; and activate, in response to the fingerprint input matching the particular fingerprint: a standard mode of operation for the mobile device in response to determining that the fingerprint input is associated with a first finger of the user; and
a panic mode of operation for the mobile device in response to determining that the fingerprint input is associated with a second finger of the user, wherein the panic mode of operation automatically disables access to a portion of personal information that is electronically stored for the user on the mobile device, establishes a network connection in response to the panic mode of operation, records data from an environment of the mobile device, and transmits data to a remote server to enable a response to the panic mode.

12. The device of claim 11, wherein the particular fingerprint is a registered fingerprint of a particular finger of the user.

13. The device of claim 11, further comprising instructions to:
receive a deactivation input; and
deactivate the panic mode of operation based on the deactivation input.

14. The device of claim 11, wherein the panic mode of operation includes at least one of emitting a beacon signal from the mobile device or transmitting an alert using a cellular network to an emergency service provider.

15. The device of claim 11, further comprising:
a camera capable of recording a photograph or a video; and
a microphone capable of recording an audio file.

16. The device of claim 15, wherein the panic mode of operation includes capturing at least one of a photograph with the camera, a video clip with the camera, or an audio clip with the microphone.

* * * * *